Patented July 2, 1935

2,006,345

UNITED STATES PATENT OFFICE 2,006,345

RESINOUS COMPOSITION

Thomas S. Carswell, Kirkwood, Mo., assignor to Monsanto Chemical Company, St. Louis, Mo., a corporation of Delaware No Drawing. Application June 22, 1934, Serial No. 732,000

12 Claims. (Cl. 106—22)

This invention relates to the manufacture of plastic and resinous compositions, such as are employed in the manufacture of films, sheets, surfacing or coating compositions, molding compositions, impregnating compositions, etc. and it has particular relation to the manufacture of resinous materials of the phenol-aldehyde condensation products, an example of which is "bakelite" and polyhydric alcohol-carboxylic acid condensation products, an example of which is alkyd resins.

The present application is a continuation-in-part of my copending application, Serial No. 460,103, filed June 9, 1930, entitled Resinous compositions.

Resinous compositions of the class indicated above suffer certain disadvantages by reason of their lack of flexibility, susceptibility to fracture, as well as their tendency to pass into a semi-infusible state prematurely in the course of their manufacture. Heretofore it has been suggested that these short-comings can be overcome by incorporating with the resinous mass, while still in a fluid condition, such materials as paratoluene-sulfonamid, diethyl phthalate, dibutyl phthalate and the corresponding esters of acids, such as succinic, maleic, fumaric, etc.

In my copending application I disclose that the phenolic esters of phthalic and benzoic acids, such for example as diphenyl phthalate, are peculiarly suited for use as modifying agents for resinous compositions. Thus, for example, these materials are compatible with the fluid resins without prolonged heating. Moreover the resulting product is not only toughened and rendered less susceptible to fracture, but is also more easily machined and cut. The incorporation of the phenolic ester delays the solidification of the mass and enables one to saturate fabric compositions with the resin without experiencing the difficulties arising from jellification and formation of the semi-infusible condensation product.

Unlike the dialkyl esters of dicarboxylic acids, notably phthalic acid, which hydrolyze readily, particularly under alkaline conditions and are therefore not suitable for uses wherein the product is exposed to adverse weather or corrosive conditions, the phenyl esters are relatively more stable. They do not hydrolyze readily even under conditions which would decompose the corresponding alkyl esters rapidly.

My attention has heretofore been drawn to the Baekeland patents wherein phthalic anhydride is incorporated with a phenol-aldehyde mixture with the observation that the phenol-aldehyde combines with the phthalic anhydride to form phenol phthalate. My experience has indicated, however, that phenol and phthalic anhydride do not combine directly to form phenyl phthalate, which fact is abundantly affirmed by the literature. Whatever action does obtain when phthalic anhydride is heated with phenol and an aldehyde, it is quite clear that diphenyl phthalate cannot form.

In contrast to the present day practice, I incorporate the diphenyl phthalate with the resin while it is still in a fusible condition and thereafter employ the mixture as a lacquer or varnish coating composition, either alone or with the aid of a suitable solvent, or as a molding or impregnating composition in a manner well understood by those skilled in this art. In any case the precise manner of practicing the invention depends to a large extent upon the specific use to be made of the ultimate product. In general, the plasticizer is incorporated in the resin while the resin is in a fused condition, or while it is dispersed or dissolved in the usual solvents.

To illustrate the manner in which the plasticizers or modifying agents may be employed, specific examples are hereinafter set forth:

Example 1.—Approximately 50 parts of glycerol phthalate anhydride resin, which is still in a fusible stage, are melted and mixed with 15–20 parts of diphenyl phthalate; the plasticizer will be found to dissolve in the resin without difficulty. While still in a fluid state the material may be used for the purpose of impregnating fabric as in the manufacture of laminated compositions, or may be baked or molded at an elevated temperature (approximately 180° C.) in the usual manner.

Example 2.—50 parts of a phenol-aldehyde reaction product which is in fusible form, are melted and mixed with 10–25 parts of dicresyl phthalate, after which the resulting homogeneous mixture is baked or molded at an elevated temperature, thereby rendering the product infusible.

Example 3.—25 parts of a fusible phenol-aldehyde reaction product, similar to that described in Example 2, which is obtainable on the market, is fluxed and mixed with 5–10 parts of an equal molecular mixture of diphenyl phthalate and phenyl-benzoate. Thereafter the mixture is rendered infusible by the usual heat treatment.

In lieu of diphenyl phthalate, dicresyl phthalate, phenyl-benzoate, cresyl-benzoate or mixtures of these materials, one may substitute the homologues and the derivatives of these materials, particularly the nuclear substitution products, such as monochlorphenol benzoate, trichlorphenyl benzoate, di-trichlorphenol phthalate.

I have also found that mixed esters of various cresols and xylenols such as are present in cresylic acids of commerce are valuable due to the low melting point of these products and the fact that they do not crystallize readily, and finally they share the advantage of resistance toward alkalies common to the materials which I have disclosed previously. Materials of this type may be made readily by proceeding as follows:

*Example A.*—Two molar proportions of anhydrous freshly distilled cresylic acid having a boiling point range of 198° C.–213° C. from which a substantial quantity of ortho cresol, normally present therein, has previously been separated as by fractionation, are agitated and maintained at approximately 80° C. while there is added slowly one molar proportion or slightly less of phthalyl chloride. After all of the chloride has been added and the evolution of hydrogen chloride has subsided, the temperature is raised to 110° C.–140° C. to insure the completion of the reaction. The product is then cooled and washed with a dilute aqueous solution (approximately 2%) of caustic soda whereby the unreacted phthalyl chloride, phthalic anhydride, hydrogen chloride and cresylic acid is dissolved and separated from the ester. The excess alkali is then removed by washing with water. Any coloration which may have developed is removed by means of an absorbent or decolorizing agent, such as charcoal, fuller's earth, etc., or by distillation, preferably under reduced pressure.

*Example B.*—A mixture containing all three cresols as they are obtained from the refining of cresylic acid having a boiling point range of 190° C.–212° C. may be reacted with phthalyl chloride in a manner substantialy as indicated in Example A. The product so obtained will be found to be a liquid which upon long standing crystallizes and which liquefies at slightly elevated temperatures. A small quantity of phenol is usually present in the cresylic acid of the grade specified hereinabove. However, if desired, an additional quantity of phenol may be added whereby one obtains a product which is not a true mixed cresyl phthalate, but rather is a mixed cresyl phenyl phthalate. The properties will, however, not be changed materially.

*Example C.*—A cresylic acid having a boiling point of 190° C.–250° C., approximately 95% of which distills between 218° C.–247° C., is caused to react with phthalyl chloride in a manner analogous to that described in Example A. Evolution of the hydrogen chloride if sluggish and apparently incomplete may be facilitated by raising the temperature of the reaction mixture.

*Example D.*—A mixed ester of succinic acid may be produced by adding a molar proportion of succinyl chloride to two molar proportions of cresol, such as is set forth in Example A, and following in general the procedure set forth in Example A.

The esters contemplated by this invention, and particularly the aromatic dicarboxylic acid and saturated aliphatic acid esters lend themselves readily to a permanganate purification treatment by which an odorless and substantially colorless product is obtained, which is stable to the influence of the ordinary atmospheric conditions, and is well adapted for use in the manufacture of plastics, notably, phenolaldehydic compositions. For this purpose, the neutral ester from which the unreacted acid chloride and free phenolic compositions have been removed, preferably by washing, at ordinary temperatures, with a dilute aqueous alkali solution is agitated for 10–20 hours with a dilute aqueous permanganate solution, such, for example, as sodium permanganate or potassium permanganate. The time of treatment as well as the quantity of permanganate employed will vary with the quality of cresylic acid employed in the manufacture of the ester, and can be determined most conveniently by actual trial. In general, I have found that 1% of potassium permanganate based on the quantity of ester being treated which is dissolved in water to give a 1%–2% solution is satisfactory and sufficient. Ordinary temperature conditions may be employed. The permanganate treatment is complete when after several hours' agitation a distinct permanganate coloration persists in the aqueous fraction.

Manganese dioxide is precipitated in the course of this treatment which can be removed conveniently by the addition of a sulphur dioxide or a sulphite preferably in the presence of a small quantity of sulphuric acid. If desired, precipitated manganese dioxide may be separated by filtration. In either instance, the ester is washed carefully with water to remove all the water soluble materials. The purified ester product is then dried by the application of heat and preferably under reduced pressure.

The aforedescribed method of purification is applicable to the purifications of diphenyl phthalate and similar esters, the use of which is contemplated by the present invention.

*Example 4.*—Substitute 2–8 parts of an ester product such as is obtained as described in Examples A to D inclusive, for the dicresyl phthalate of Example 2 or the diphenyl phthalate and phenyl benzoate mixture of Example 3 and otherwise proceed as described in the respective examples.

I have also found that the neutral phenolic esters of dicarboxylic acid in which the phenol is substituted by hydrocarbon groups, including the following groups: phenyl ($C_6H_5$), benzyl ($CH_2C_6H_5$) or alkyl radicals such as butyl, amyl, octyl, or mixtures of alkyl radicals are especially useful. I have also found that if the substituent group, whether it be phenyl, benzyl or alkyl, is substituted in an ortho position with respect to the hydroxy group of the phenol, the degree of compatibility over the corresponding para compounds is increased substantially. Moreover, the ortho substituted esters or esters containing a substantial amount of ortho substituted phenols tend not to crystallize which is a distinct advantage particularly since they may be dissolved or otherwise conveniently incorporated in the phenol aldehyde base.

The phenolic esters referred to hereinabove may be made by methods analogous to those already described. For example, di (para tertiary butyl phenol) phthalate is made by mixing two mols of para tertiary butyl phenol with one mol of phthalyl chloride and gradually increasing the temperature from about 50° C. to about 105° C. Hydrogen chloride is evolved. The evolution may be facilitated by effecting the reaction under partial vacuum. Alternatively, a dry inert gas may be bubbled through the mixture to effect the same purpose. After the reaction is substantially complete (in general this requires from 10 to 18 hours), the product is dissolved in hot alcohol and the solution cooled to 5° C. whereupon crystals are deposited and filtered from the alcoholic solution. The product melts at approximately 139.5° C.–140° C.

Di (para benzyl phenol) phthalate is made in an analogous manner. The crystalline product thus obtained melts at 122.5° C.–123° C. It is colorless, odorless and soluble in hot linseed oil and hot tung oil.

Di (ortho benzyl phenol) phthalate and di (ortho phenyl phenol) phthalate are made by methods analogous to that described in connection with di (para tertiary butyl phenol) phthalate, but the resulting product is not crystalline and the refining operation is therefore modified to afford a good recovery. To this end the crude material is purified by dissolving in benzol and washing three times with dilute aqueous caustic soda. Thereafter the benzol solution is washed three times with water and, if desired, the resulting solution may be treated with a suitable decolorizing agent before removing the solvent by heating for 10 to 14 hours at 100° C. during the later stages at 5–8 mm. to remove the last traces of benzol. The benzyl phenol ester will be found to be a light amber, tacky resin, soluble in linseed oil and tung oil at ordinary temperatures. The phenyl phenol product is not as tacky as the benzyl phenol product but has its characteristic resinous consistency.

In lieu of the foregoing phenolic esters one may make the corresponding amyl and octyl phenol derivatives by substituting molar equivalent quantities of amyl phenol or octyl phenol. Similarly, one may substitute succinyl chloride for phthalyl chloride to form the corresponding succinate esters. In addition to the phthalate benzoate and succinate esters, the present invention contemplates the use of other dihydroxy acid esters, notably fumaric and maleic esters. The phenolic aldehyde products obtained when 10% to 20% by weight of the esters is incorporated therewith are characterized by their alkali resistance, their reduced fluxing temperature and improved resistance to water or other weathering conditions. Although the present invention contemplates phenolic esters of benzoic acid and dicarboxylic acids, for many purposes I prefer that the phenol shall be an ortho substituted phenol in which the substituent group is a hydrocarbon of the aryl, aralkyl or alkyl species. In the case of di substituted phenols which fall within the spirit of the present invention, I prefer those phenols wherein at least one of the substituents is ortho to the hydroxyl group, the ortho substituted compounds being resinous or crystallizable only with difficulty, and having a greater degree of compatibility than the corresponding para substituted compound.

It is to be understood that I make no claim here to the method of preparing the phenolic esters, but since these materials have in many cases not been described in the literature, the method of preparation is set forth in greater detail than would otherwise be necessary. It is likewise to be understood that I make no claim in this application to the mixture of the phenol aldehyde resin and phenolic esters together with drying oils. It is to be understood that the products obtained may be used advantageously in this manner.

Although I have referred to phenol aldehyde resins, it is to be understood that the application is not limited to a condensation product of phenol (mono hydroxy benzene) with an aldehyde such as formaldehyde, acetaldehyde, furfuraldehyde, but includes substituted phenols such as cresols, xylenols and mixtures of phenols in which the phenol may consist wholly or in part of cresols or mixtures of cresols and xylenols such as are present in commercial cresylic acid, also condensation products in which the phenol consists at least in part of phenyl phenols, benzyl phenols and the higher alkyl substituted phenols such as butyl phenol, dibutyl phenol, amyl phenol, octyl phenol, etc. The expression "phenol aldehyde" resin therefore contemplates the broad class of phenol aldehyde resins including phenol aldehyde resins which have been modified with various substances including rosin, as is well understood by those skilled in the art.

Similarly, it is to be understood that the phenolic ester modifying agents contemplated by the present invention may be employed advantageously in modified alkyd resins as well as the unmodified form wherein glycerol and a dicarboxylic acid, such as phthalic acid, are the principal constituents. Modified alkyd resins wherein monocarboxylic acids, such as rosin, the higher fatty acids, including the drying oil fatty acids, are likewise well known to those skilled in the art.

Obviously, if the compositions are to be employed in varnishes or lacquers or films the final molding step is omitted. In this instance the film is generally formed with the aid of a solvent and is thereafter baked in a manner which is well understood by those skilled in the art. It will be apparent, of course, that if desired, fillers, accelerators or coloring matter, as well as additional plasticizers or other materials may be added to the resin. It is likewise to be understood, of course, that the specific procedures set forth above are merely exemplary of a method of employing the plasticizers. As is well known to those skilled in the art the manner of employing the plasticizers depends to a large extent on the nature of the product which is being made. Under the circumstances the invention herein will be understood to consist in the disclosure of a new class of compositions capable of softening or plasticizing resinous materials whether used alone or in combination with other plasticizers or other modifying agents and regardless of whether the resin is the reaction product of a single class of organic compositions or a mixture of compositions.

I claim:

1. A resinous composition comprising an artificial resin selected from the group consisting of the alkyd and phenol aldehdye resins and a neutral monohydroxyphenol ester of a carboxylic acid selected from the group consisting of aliphatic dicarboxylic acids and aromatic mono- and dicarboxylic acids in an amount sufficient to increase the resistance of the composition to fracture and to the action of moisture and alkali.

2. A resinous composition comprising an artificial resin selected from the group consisting of the alkyd and phenol aldehyde resins and a neutral monohydroxyphenol ester of an aromatic carboxylic acid in an amount sufficient to increase the resistance of the composition to fracture and to the action of moisture and alkali.

3. A resinous composition comprising an artificial resin selected from the group consisting of the alkyd and phenol aldehyde resins and a neutral monohydroxyphenol ester of phthalic acid in an amount sufficient to increase the resistance of the composition to fracture and to the action of moisture and alkali.

4. A resinous composition comprising an artificial resin selected from the group consisting of the alkyd and phenol aldehyde resins and a neutral monohydroxyphenol ester of phthalic acid wherein the phenol of the ester contains as a substituent a hydrocarbon radical selected from the group aryl, aralkyl, and alkyl, in an amount sufficient to increase the resistance of the composition to fracture and to the action of moisture and alkali.

5. A resinous composition comprising an artificial resin selected from the group consisting of the alkyd and phenol aldehyde resins and a neutral monohydroxyphenol ester of phthalic acid wherein the phenol of the ester contains as a substituent in the ortho position a hydrocarbon radical selected from the group aryl, aralkyl, and alkyl, in an amount sufficient to increase the resistance of the composition to fracture and to the action of moisture and alkali.

6. A resinous composition comprising an artificial resin selected from the group consisting of the alkyd and phenol aldehyde resins and a neutral monohydroxyphenol ester of a carboxylic acid selected from the group consisting of aliphatic dicarboxylic acids and aromatic mono- and dicarboxylic acids wherein the phenol of the ester contains as a substituent a hydrocarbon radical selected from the group aryl, aralkyl, and alkyl, in an amount sufficient to increase the resistance of the composition to fracture and to the action of moisture and alkali.

7. A resinous composition comprising an artificial resin selected from the group consisting of the alkyd and phenol aldehyde resins and a neutral monohydroxyphenol ester of a carboxylic acid selected from the group consisting of aliphatic dicarboxylic acids and aromatic mono- and dicarboxylic acids wherein the phenol of the ester contains as a substituent in the ortho position a hydrocarbon radical selected from the group aryl, aralkyl, and alkyl, in an amount sufficient to increase the resistance of the composition to fracture and to the action of moisture and alkali.

8. A resinous composition comprising an artificial resin selected from the group consisting of the alkyd and phenol aldehyde resins and a neutral monohydroxyphenol ester of phthalic acid wherein the phenol of the ester contains chlorine as a substituent in an amount sufficient to increase the resistance of the composition to fracture and to the action of moisture and alkali.

9. A resinous composition comprising an artificial resin selected from the group consisting of the alkyd and phenol aldehyde resins and diphenyl phthalate in an amount sufficient to increase the resistance of the composition to fracture and to the action of moisture and alkali.

10. A resinous composition comprising a phenol aldehyde resin and a neutral monohydroxyphenol ester of a carboxylic acid selected from the group consisting of aliphatic dicarboxylic acids and aromatic mono- and dicarboxylic acids in an amount sufficient to increase the resistance of the composition to fracture and to the action of moisture and alkali.

11. A resinous composition comprising a phenol aldehyde resin and diphenyl phthalate in an amount sufficient to increase the resistance of the composition to fracture and to the action of moisture and alkali.

12. In the manufacture of resinous phenol aldehyde condensation products the step which comprises incorporating in the condensation product, while said product is in a fluid condition, a neutral diphenyl ester of phthalic acid in an amount sufficient to increase the resistance of the resulting composition to fracture and to moisture and alkali.

THOMAS S. CARSWELL.